United States Patent
Seo

(10) Patent No.: US 9,604,583 B2
(45) Date of Patent: Mar. 28, 2017

(54) WHEEL RESONATOR FOR VEHICLE

(71) Applicant: Hyundai Motor Company, Seoul (KR)

(72) Inventor: Jeong In Seo, Uiwang-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/934,488

(22) Filed: Nov. 6, 2015

(65) Prior Publication Data

US 2016/0288738 A1    Oct. 6, 2016

(30) Foreign Application Priority Data

Mar. 31, 2015  (KR) .................. 10-2015-0044930

(51) Int. Cl.
| | | |
|---|---|---|
| *B60B 21/12* | (2006.01) | |
| *G10K 11/172* | (2006.01) | |
| *B60R 13/08* | (2006.01) | |
| *B60B 21/00* | (2006.01) | |
| *G10K 11/16* | (2006.01) | |

(52) U.S. Cl.
CPC .......... *B60R 13/0884* (2013.01); *B60B 21/12* (2013.01)

(58) Field of Classification Search
CPC .............. B60B 21/12; B60B 2900/131; B60B 2900/133; B60C 19/002
USPC ................ 181/206, 207; 301/95.104, 95.101
See application file for complete search history.

(56) References Cited

U.S. PATENT DOCUMENTS

| | | | | |
|---|---|---|---|---|
| 4,782,877 A | * | 11/1988 | Frerichs ................ | B60B 21/021 152/379.5 |
| 4,896,921 A | * | 1/1990 | Sato ........................ | B60B 21/12 152/153 |
| 5,891,278 A | * | 4/1999 | Rivin ...................... | B60B 21/12 152/400 |
| 5,899,253 A | * | 5/1999 | Marron ................... | B60B 21/12 152/381.5 |
| 6,309,026 B1 | * | 10/2001 | Svedhem ................ | B60C 19/00 152/209.2 |
| 6,516,849 B2 | * | 2/2003 | Flament .................... | B60C 3/06 152/381.5 |
| 7,152,643 B2 | * | 12/2006 | Morinaga ................ | B60B 3/02 152/381.5 |
| 7,694,706 B2 | * | 4/2010 | Ikeda ...................... | B60B 3/005 152/331.1 |
| 7,740,035 B2 | * | 6/2010 | Fowler-Hawkins .. | B60C 19/002 152/339.1 |

(Continued)

FOREIGN PATENT DOCUMENTS

| | | | |
|---|---|---|---|
| FR | 2992257 A1 * | 12/2013 | ............. B60B 21/12 |
| JP | 2002-234304 A | 8/2002 | |

(Continued)

*Primary Examiner* — Edgardo San Martin
(74) *Attorney, Agent, or Firm* — Morgan, Lewis & Bockius LLP

(57) ABSTRACT

A wheel resonator for a vehicle may include a resonant plate which has an annular structure that is wound around a rim portion of a wheel while maintaining predetermined tension, has resonant holes formed at predetermined intervals in a circumferential direction, and forms a resonant chamber together with a surface of the rim portion, and sealing plates formed integrally with both end portions of the resonant plate, and tightly attached to and supported on an inner wall surface of the rim portion.

5 Claims, 4 Drawing Sheets

[ CROSS SECTION TAKEN ALONG LINE A-A ]

(56) References Cited

U.S. PATENT DOCUMENTS

| | | | | |
|---|---|---|---|---|
| 8,181,685 | B2 * | 5/2012 | Kamiyama | B60B 1/08 |
| | | | | 152/381.5 |
| 8,490,665 | B2 * | 7/2013 | Nagata | B60B 1/06 |
| | | | | 152/381.6 |
| 9,090,128 | B2 * | 7/2015 | Zhu | B60C 19/002 |
| 9,302,537 | B2 * | 4/2016 | Zhu | B60B 21/00 |
| 9,315,076 | B2 * | 4/2016 | Sakakibara | B60C 5/00 |
| 2016/0059624 | A1 * | 3/2016 | Mohan | B60B 25/22 |
| | | | | 301/95.11 |
| 2016/0082769 | A1 * | 3/2016 | Ishii | B60B 21/026 |
| | | | | 301/63.101 |

FOREIGN PATENT DOCUMENTS

| | | | |
|---|---|---|---|
| JP | 2002-307905 A | 10/2002 | |
| JP | 2003-326907 A | 11/2003 | |
| JP | 2004-306715 A | 11/2004 | |
| JP | 2007-145191 A | 6/2007 | |
| JP | 2009-074595 A | 4/2009 | |
| JP | 2010-095069 A | 4/2010 | |
| JP | 2010-095125 A | 4/2010 | |
| JP | 4830014 B2 | 9/2011 | |
| JP | 2012-040968 | 3/2012 | |
| JP | 2012-045971 | 3/2012 | |
| JP | 2012-051397 | 3/2012 | |
| JP | 2013-107599 | 6/2013 | |
| JP | 2014-084039 | 5/2014 | |
| JP | EP 2783879 A1 * | 10/2014 | B60C 19/002 |

* cited by examiner

[ CROSS SECTION TAKEN ALONG LINE A-A ]

WHEEL RESONATOR FOR VEHICLE

CROSS-REFERENCE TO RELATED APPLICATION

The present application claims priority to Korean Patent Application No. 10-2015-0044930 filed Mar. 31, 2015, the entire contents of which is incorporated herein for all purposes by this reference.

BACKGROUND OF THE INVENTION

Field of the Invention

The present invention relates to a wheel resonator for a vehicle. More particularly, it relates to a wheel resonator for a vehicle, which is manufactured to have a structure having predetermined tension and mounted on a rim portion of a wheel, thereby reducing noise at a resonant frequency band in a tire.

Description of Related Art

In general, an aluminum wheel for a vehicle includes a horizontal body portion which is exposed to the outside, and a rim portion which is formed integrally with the horizontal body portion and on which a tire is mounted.

The tire, which is mounted on the rim portion of the wheel for a vehicle, consistently causes friction with a road surface while the vehicle travels, such that noise is inevitably generated in the tire, and this noise is reflected between an inner surface of the tire and the rim, which causes resonance.

The resonance of noise, which is generated in the inside between the tire and the rim portion, is transmitted to the interior of the vehicle as a sound having a predetermined peak, which causes noise in the interior of the vehicle.

Therefore, as a method of reducing resonant noise in the tire, a method of mounting a resonator on the rim portion of the wheel is applied.

Here, a wheel resonator for a vehicle in the related art will be described below.

The attached FIG. 1 is a cross-sectional perspective view illustrating a wheel resonator in the related art.

A wheel resonator 10 in the related art is formed in a flat tubular structure that has a resonant chamber 12 with a predetermined internal volume and is manufactured so that rim portion fastening ends 14 protrude at both ends of the resonant chamber 12, and several wheel resonators 10 are mounted on the rim portion 22 of the wheel 20 at equal intervals in a circumferential direction.

In particular, a separate fastening structure needs to be formed on the rim portion 22 in order to mount the wheel resonator 10 in the related art on the rim portion 22 of the wheel 20.

That is, separate support walls 24 need to integrally protrude at both sides of the rim portion 22, and fitting grooves 26 need to be formed on inner surfaces of the support walls 24.

Resonant holes 16 are formed at side portions of the resonator 10, and as a result, separate through grooves 28, which are matched with the resonant holes, need to be further processed in the support walls 24 of the rim portion 22.

Therefore, the resonator 10 in the related art is completely mounted to the wheel 20 by coupling the fastening ends 14, which are formed at both ends of the wheel resonator 10, to the fitting grooves 26 that are formed in the support walls 24 of the rim portion 22, and the resonant chamber 12 of the wheel resonator 10 serves to reduce noise at a resonant frequency band in the tire.

However, since the wheel resonator in the related art is fastened by being fitted into the rim portion, there are the following problems.

First, since an additional support wall structure needs to be formed on the rim portion of the wheel in order to fasten the wheel resonator in a way that the wheel resonator is fitted into the rim portion, there are problems in that costs required to manufacture the wheel are increased, and a weight of the wheel is increased.

Second, when the wheel resonator is fastened to the wheel in a way that the wheel resonator is fitted into the wheel, the wheel eventually holds the resonator, and as a result, external force, such as consistent frictional force between the tire and the road surface and consistent rotational force of the wheel, is applied to the resonator, such that there is concern that the fastened state of the resonator will be loosened, and the resonator will deviate from the rim portion.

Third, since several separated resonators are mounted on the rim portion of the wheel, it is difficult to maintain a wheel balance.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a wheel resonator for a vehicle, which is manufactured to have a structure having its own tension and an arcuate cross-sectional structure instead of a tubular structure, is mounted on the rim portion of the wheel while having predetermined tension, and forms a resonant chamber together with the rim portion, thereby easily mounting the resonator on the rim portion without separately changing a wheel structure.

According to various aspects of the present invention, a wheel resonator for a vehicle may include a resonant plate which has an annular structure that is wound around a rim portion of a wheel while maintaining predetermined tension, has resonant holes formed at predetermined intervals in a circumferential direction, and forms a resonant chamber together with a surface of the rim portion, and sealing plates formed integrally with both end portions of the resonant plate, and tightly attached to and supported on an inner wall surface of the rim portion.

The resonant plate and the sealing plates may be made of a plastic material having its own tension.

A rigidity reinforcing flange, which protrudes toward the resonant chamber, may be formed integrally with an inner circumferential portion of the resonant hole.

Inner partition walls, which are tightly attached to the surface of the rim portion to divide the resonant chamber into several chambers and reinforce rigidity in a radial direction, may be formed integrally with a bottom surface of the resonant plate.

The resonant plate and the sealing plates may be formed as an annular band piece which has a length smaller than a diameter of the rim portion of the wheel and has both free ends, and the resonant plate and the sealing plates may be wound around the rim portion and extended so that the resonant plate has predetermined tension, and then both the free ends are integrated by laser welding or high frequency welding.

Through the aforementioned technical solutions, the present invention provides the effects below.

First, the resonator of the present invention is manufactured to have an arcuate cross-sectional structure instead of a tubular structure by using a material having its own tension, and mounted on the rim portion of the wheel while maintaining predetermined tension, so as to form the resonant chamber together with the rim portion, thereby easily reducing road noise at a resonant frequency band in the tire.

Second, the resonator of the present invention is mounted on the rim portion of the wheel while being wound around the rim portion of the wheel by predetermined tension, and as a result, the resonator is securely mounted on the wheel while holding the wheel, thereby preventing the resonator from deviating from the rim portion.

Third, the resonator of the present invention may be easily mounted on the rim portion only by its own tension without separately changing a wheel structure, thereby preventing a weight and manufacturing costs from being increased due to a change of the existing wheel structure.

Fourth, the inner partition walls and the flanges, which constitute the resonator of the present invention, serve to reinforce rigidity of the resonator, thereby preventing the resonator from being deformed by pressure caused when the tire is mounted.

Fifth, the resonant chamber is divided into several chambers by the inner partition walls that constitute the resonator of the present invention, thereby improving performance in reducing noise at a resonant frequency band in the tire.

Sixth, unlike the existing separated resonators that are mounted on the rim portion at equal intervals, the resonator of the present invention is manufactured to have an integrated structure in which only the resonant chamber is divided into several chambers, and the entire resonant chamber is surround by the rim portion, thereby smoothly maintaining a wheel balance.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
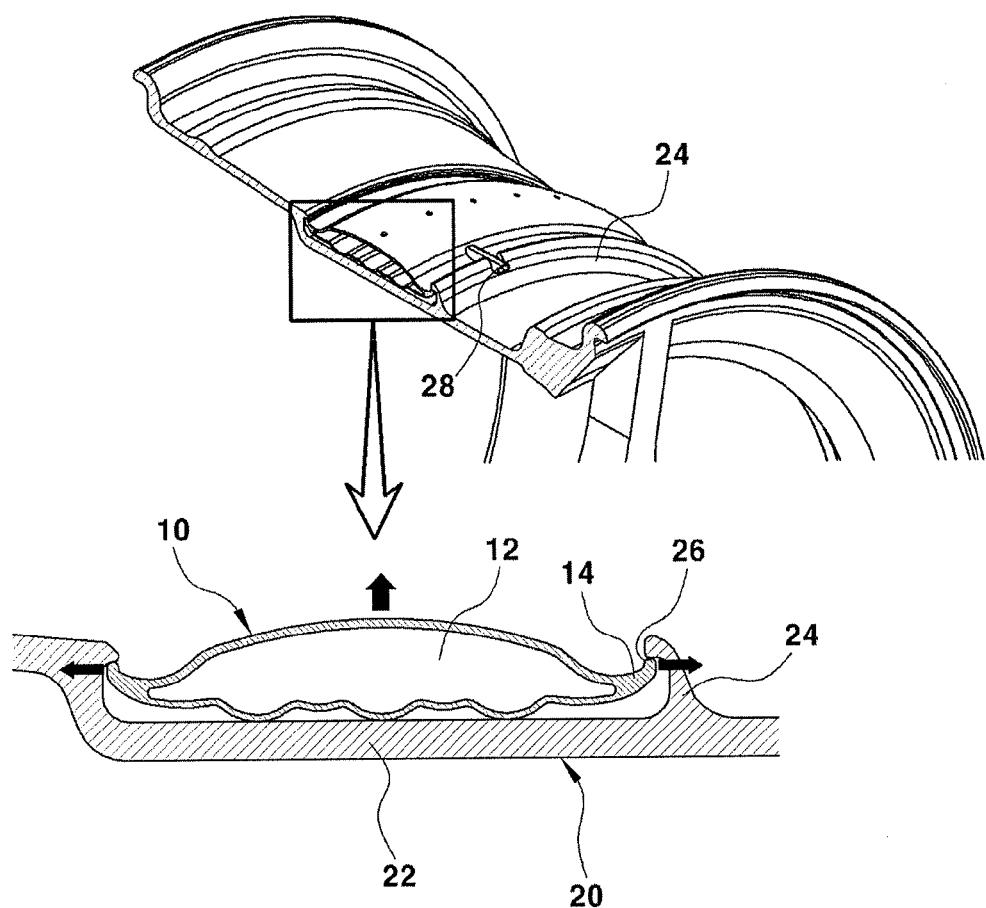
FIG. 1 is a cross-sectional perspective view illustrating a structure of a wheel resonator in the related art.
Figure 2:
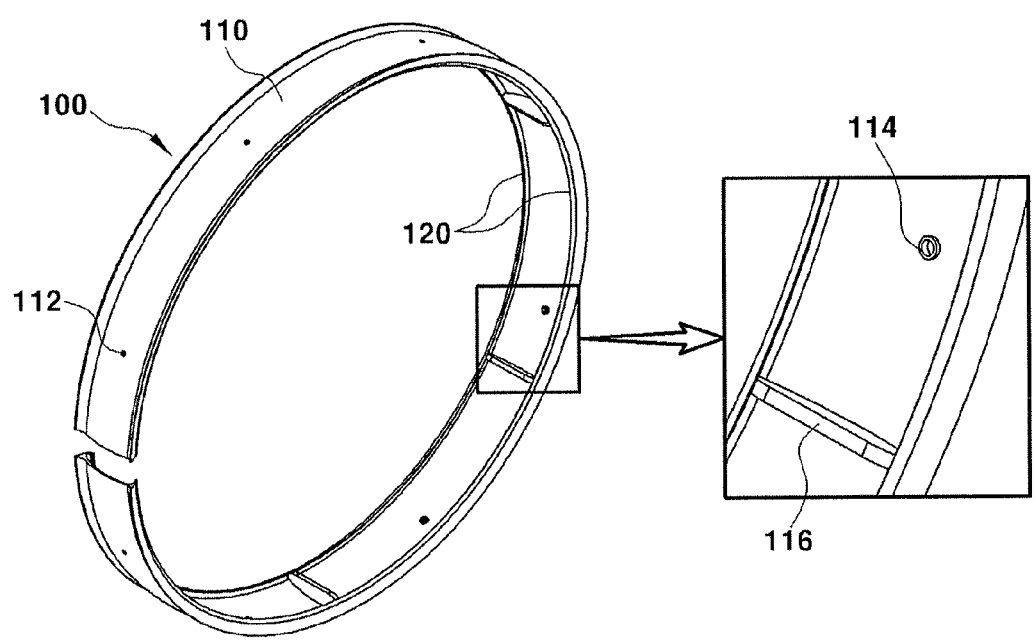
FIG. 2 is a perspective view illustrating an exemplary wheel resonator according to the present invention.
Figure 3:
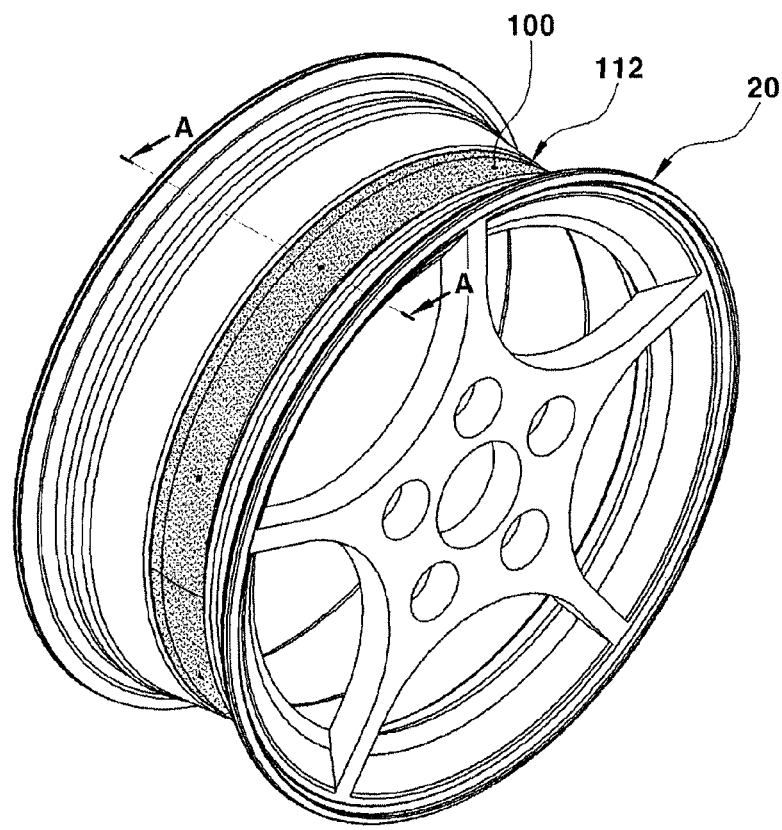
FIG. 3 is a perspective view illustrating a state in which the exemplary wheel resonator according to the present invention is mounted.
Figure 4:
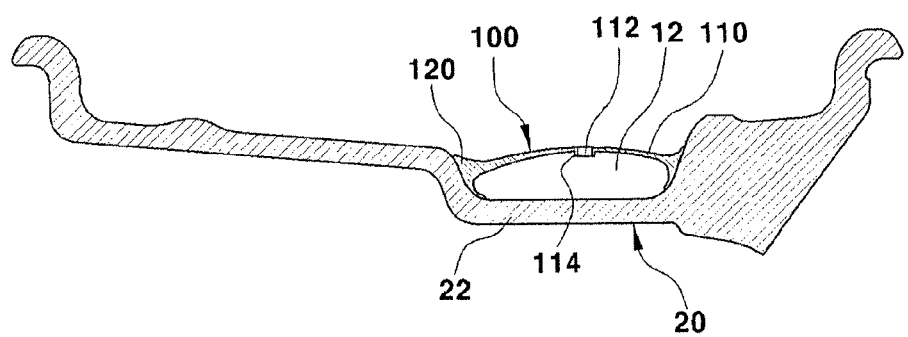
FIG. 4 is a cross-sectional view illustrating a state in which the exemplary wheel resonator according to the present invention is mounted.

The attached FIG. 2 is a perspective view illustrating a wheel resonator according to the present invention, and FIGS. 3 and 4 each are a perspective view and a cross-sectional view illustrating a state in which the wheel resonator according to the present invention is mounted.

As illustrated in FIGS. 2 to 4, unlike the existing tubular resonator, a wheel resonator according to the present invention is manufactured to have an arcuate cross-sectional structure so as to form a resonant chamber together with a rim portion of a wheel, and particularly, the wheel resonator is formed to have an annular structure by using a plastic material, for example, polypropylene, so as to have its own tension.

To this end, a wheel resonator 100 of the present invention includes a resonant plate 110 which has an annular structure that is wound around a rim portion 22 of a wheel 20 while maintaining predetermined tension, has resonant holes 112 formed at predetermined intervals in a circumferential direction, and forms a resonant chamber 12 together with a surface of the rim portion 22, and sealing plates 120 which are formed integrally with both end portions of the resonant plate 110, and tightly attached to and supported on an inner wall surface of the rim portion 22 to seal the resonant chamber 12.

In this case, the wheel resonator 100 of the present invention is formed by using a plastic material, for example, polypropylene, which is advantageous in reducing a weight because of low density and has a predetermined elongation percentage so as to maintain predetermined tension when the plastic material extends. Therefore, the resonant plate 110 and the sealing plates 120, which constitute the wheel resonator 100, have its own tension when the wheel resonator 100 is mounted on the rim portion 22.

The wheel resonator 100 according to the present invention, that is, the resonant plate 110 and the sealing plates 120 are first formed as an annular band piece, which has a length smaller than a diameter of the rim portion 22 of the wheel and has both free ends, and then the wheel resonator of the present invention is completely assembled to the rim portion of the wheel by extending the annular band piece so that the annular band piece has predetermined tension, winding the annular band piece around the rim portion 22, and then integrating both the free ends by laser welding.

Therefore, the resonator 100 of the present invention is mounted on the rim portion 22 of the wheel 20 while being wound around the rim portion 22 of the wheel 20 by the predetermined tension, and as a result, the resonator 100 is securely mounted on the rim portion 22 of the wheel while holding the rim portion 22 of the wheel, thereby preventing the resonator 100 from deviating from the rim portion 22 due to external impact (consistent frictional force between a tire and a road surface, and consistent rotational force of the wheel).

Meanwhile, when the resonator 100 of the present invention is manufactured, a rigidity reinforcing flange 114, which protrudes toward the resonant chamber 12, is formed integrally with an inner circumferential portion of the resonant hole 112.

Inner partition walls 116, which are tightly attached to the surface of the rim portion 22 to divide the resonant chamber 12 into several chambers and reinforce rigidity in a radial direction, are formed integrally with a bottom surface of the resonant plate 110.

Therefore, even though tire mounting pressure is applied to the resonator 100 when the tire is mounted on the wheel, the rigidity reinforcing flanges 114 and the inner partition walls 116 withstand the tire mounting pressure, thereby preventing the resonator 100 from being deformed.

In particular, the inner partition walls 116, which are formed on the bottom surface of the resonant plate 110, are formed at equal intervals in the circumferential direction, such that the inner partition walls 116 are tightly attached to the surface of the rim portion 22 to divide the resonant chamber 12 into several chambers, and as the resonant chamber is divided into several chambers, several regions for reducing road noise at a resonant frequency band in the tire are present, thereby improving performance in reducing road noise.

Here, processes of manufacturing and assembling the wheel resonator according to the present invention will be described in more detail below.

Figure 5:
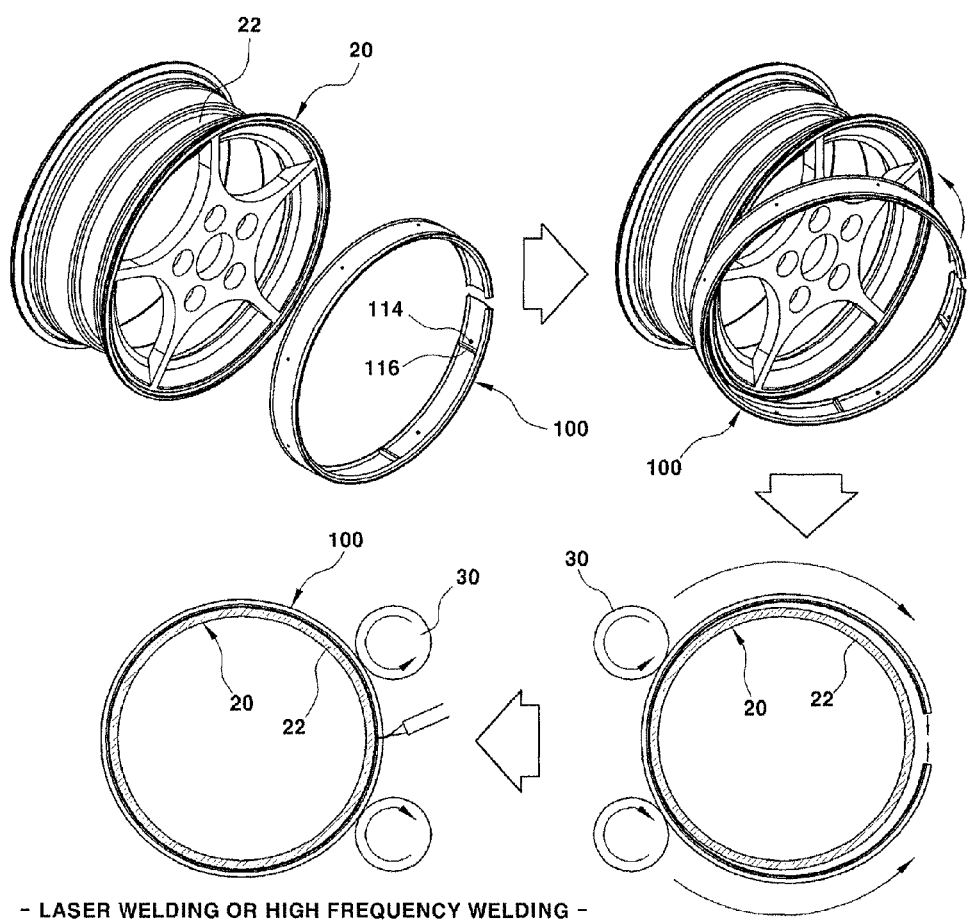
FIG. 5 is a schematic view illustrating processes of manufacturing and assembling the exemplary wheel resonator according to the present invention.

The attached FIG. 5 is a schematic view illustrating processes of manufacturing and assembling the wheel resonator according to the present invention.

First, the annular resonator 100, which has both free ends, is injection-molded by using a plastic material, and the injection-molded wheel resonator 100 has an annular band piece shape that has a length smaller than a diameter of the rim portion 22 of the wheel and has both free ends.

In more detail, as described above, the completely injection-molded wheel resonator 100 of the present invention includes: the resonant plate 110 which has an annular structure that is wound around the rim portion 22 of the wheel 20 while maintaining predetermined tension, has the resonant holes 112 formed at predetermined intervals in the circumferential direction, and forms the resonant chamber 12 together with the surface of the rim portion 22, and the sealing plates 120 which are formed integrally with both end portions of the resonant plate 110, and tightly attached to and supported on the inner wall surface of the rim portion 22 to seal the resonant chamber 12.

Next, a process of winding the resonator 100 having the annular band piece shape around the rim portion 22 of the wheel 20, and a process of extending the surface of the resonator 100 wound around the rim portion 22 by using pressing force and rotational force of a roller 30 so that the resonator 100 has predetermined tension are carried out, and since the resonator 100 is made of a plastic material having a predetermined elongation percentage, the resonator 100 easily extends to have predetermined tension.

Next, both the free ends of the resonator 100, which is wound around the rim portion 22 and extended, are joined and integrated by using laser welding or high frequency welding, and as a result, the wheel resonator of the present invention is completely assembled to the rim portion 22 of the wheel while maintaining predetermined tension.

As described above, the resonator 100 of the present invention is manufactured to have an arcuate cross-sectional structure, instead of a tubular structure, by using a material having its own tension, and mounted on the rim portion 22 of the wheel while maintaining predetermined tension, so as to form the resonant chamber 12 together with the rim portion 22, thereby easily reducing road noise at a resonant frequency band in the tire.

That is, when a predetermined frequency according to consistent friction and rotation of the tire enters the resonant chamber 12 through the resonant hole 112 of the resonator 100 while the vehicle travels, air in the resonant chamber 12 performs a spring action, such that the predetermined frequency is changed into new vibration in the reverse phase, and the changed vibration in the reverse phase is discharged to the outside of the resonator through the resonant hole 112. As a result, a phase shift with respect to the predetermined frequency occurs, such that the predetermined frequency in the tire is dissipated, thereby reducing road noise in the tire.

For convenience in explanation and accurate definition in the appended claims, the terms "upper" or "lower", "inner" or "outer" and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A wheel resonator for a vehicle, comprising:
   a resonant plate including an annular structure wound around a rim portion of a wheel while maintaining predetermined tension and an arcuate cross-sectional structure, wherein resonant holes are formed at predetermined intervals in a circumferential direction of the wheel, and a resonant chamber is formed between the resonant plate and an inner wall surface of the rim portion; and
   sealing plates formed integrally with both end portions of the resonant plate, and attached to and supported on the inner wall surface of the rim portion,
   wherein the inner wall surface of the rim portion includes an inclined plane at both ends thereof and a distance between the ends is configured to decrease toward a bottom surface of the inner wall surface,
   wherein the wheel resonator is in a curved 'I' shape corresponding to the inclined plane at the both ends of the rim portion, and wherein the inclined plane at the both ends of the rim portion is configured to be pressed by the sealing plates formed at both ends of the curved 'I' shape of the wheel resonator.

2. The wheel resonator of claim 1, wherein the resonant plate and the sealing plates are made of a plastic material having its own tension.

3. The wheel resonator of claim 1, wherein a rigidity reinforcing flange, which protrudes toward the resonant chamber, is formed integrally with an inner circumferential portion of the resonant hole.

4. The wheel resonator of claim 1, wherein inner partition walls, which are attached to the inner wall surface of the rim portion to divide the resonant chamber into predetermined chambers and reinforce rigidity in a radial direction of the wheel, are formed integrally with a bottom surface of the resonant plate.

5. The wheel resonator of claim 1, wherein the resonant plate and the sealing plates are formed as an annular band piece which has a length smaller than a diameter of the rim portion of the wheel and has both free ends, and the resonant plate and the sealing plates are wound around the rim portion and extended so that the resonant plate has predetermined tension, and then both the free ends are integrated by laser welding or high frequency welding.

* * * * *